United States Patent
Hilford

[11] Patent Number: 6,014,927
[45] Date of Patent: Jan. 18, 2000

[54] PRUNING BALER

[76] Inventor: Michael H. Hilford, 511 Kings Row, Newport Beach, Calif. 92663

[21] Appl. No.: 09/027,505
[22] Filed: Feb. 21, 1998
[51] Int. Cl.[7] .............................. B30B 5/04; B65B 13/20
[52] U.S. Cl. ............................ 100/212; 100/8; 140/93 A
[58] Field of Search ................................. 100/1–3, 8, 32, 100/212, 102; 24/269; 140/93 A, 93.2

[56] References Cited

U.S. PATENT DOCUMENTS

| 521,088 | 6/1894 | Ogle | 100/212 |
|---|---|---|---|
| 542,363 | 7/1895 | Graham et al. | 100/212 |
| 679,735 | 8/1901 | Emans | 100/102 |
| 787,183 | 4/1905 | Irving | 100/212 |
| 813,646 | 2/1906 | Grill, Jr. | 100/212 |
| 995,939 | 6/1911 | Anderson | 100/8 |
| 1,987,318 | 1/1935 | Backenecker | 100/212 |
| 3,742,842 | 7/1973 | Pierens | 100/212 |

FOREIGN PATENT DOCUMENTS

| 363698 | 8/1906 | France | 100/212 |
|---|---|---|---|
| 245036 | 3/1912 | Germany | 100/212 |
| 64669 | 4/1942 | Norway | 100/212 |
| 51773 | 5/1922 | Sweden | 100/1 |

Primary Examiner—Stephen F. Gerrity
Attorney, Agent, or Firm—William L. Chapin

[57] ABSTRACT

A device for compressing stacks of branches or twigs pruned from trees or shrubs into compact bundles includes a winch having an elongated tubular shaft terminated at one end thereof by a hand crank, and rotatably supported by a pair of longitudinally spaced apart support structures disposed transversely to the winch shaft. Each support structure has a base plate having a lower surface adapted to abut a stack of prunings, and a bearing support structure protruding upwards from the base plate for rotatably supporting the winch shaft. An aperture through the base plate disposed radially rearwards from the winch shaft receives a tensioning rope wound around the winch shaft. The opposite end of each tensioning rope encircles a pruning stack, and is attached at longitudinally spaced apart locations to an anchor rod. The anchor rod is restrained against forward radial movement from the support structure as the ropes are tightened around a pruning stack by laying the anchor rod into the openings of J-hooks which protrude upwards from the front portions of the base plates.

20 Claims, 7 Drawing Sheets

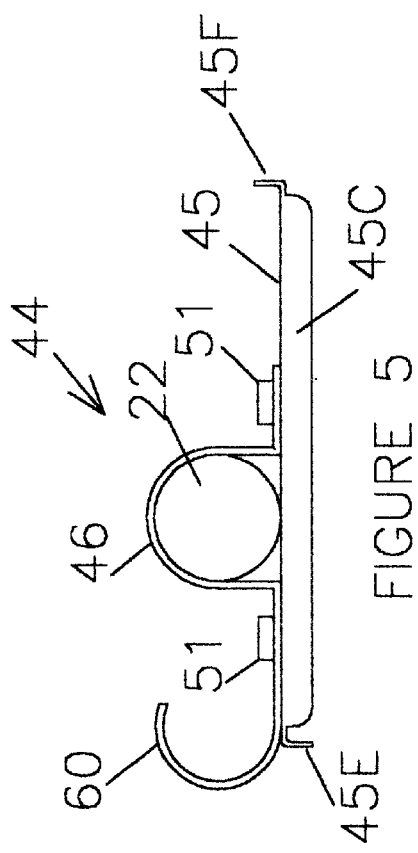
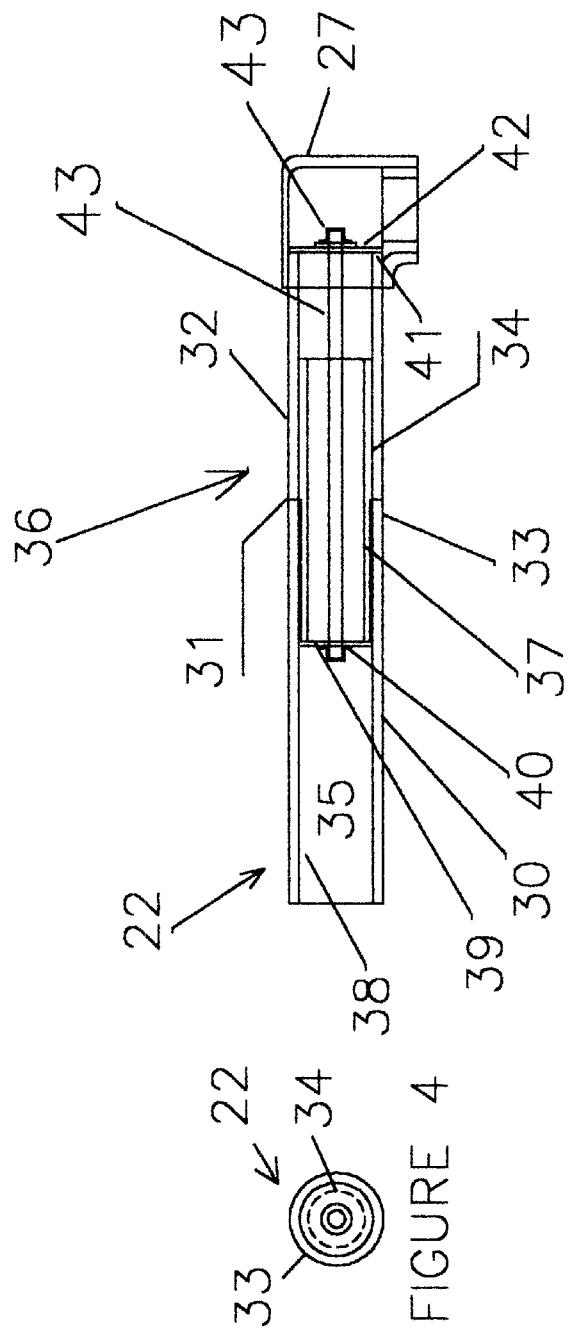

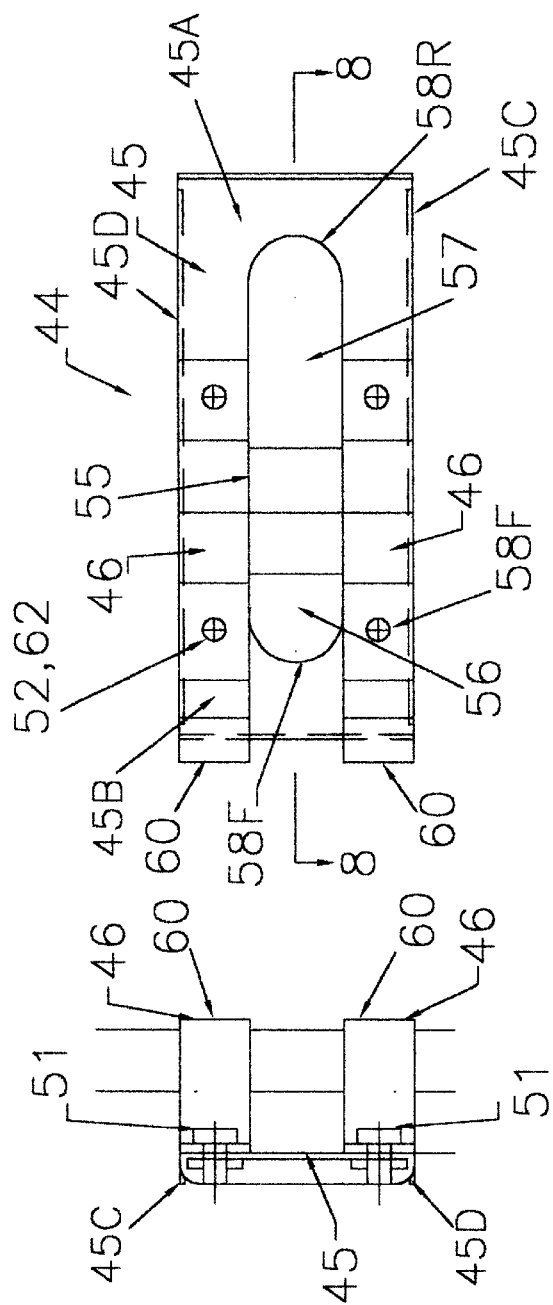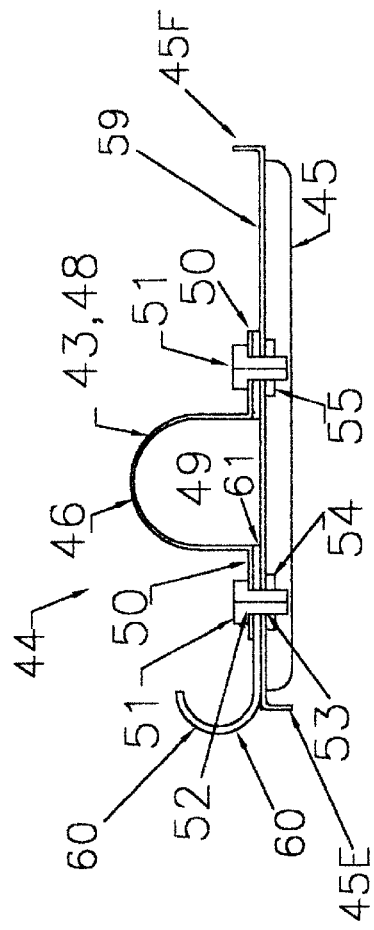

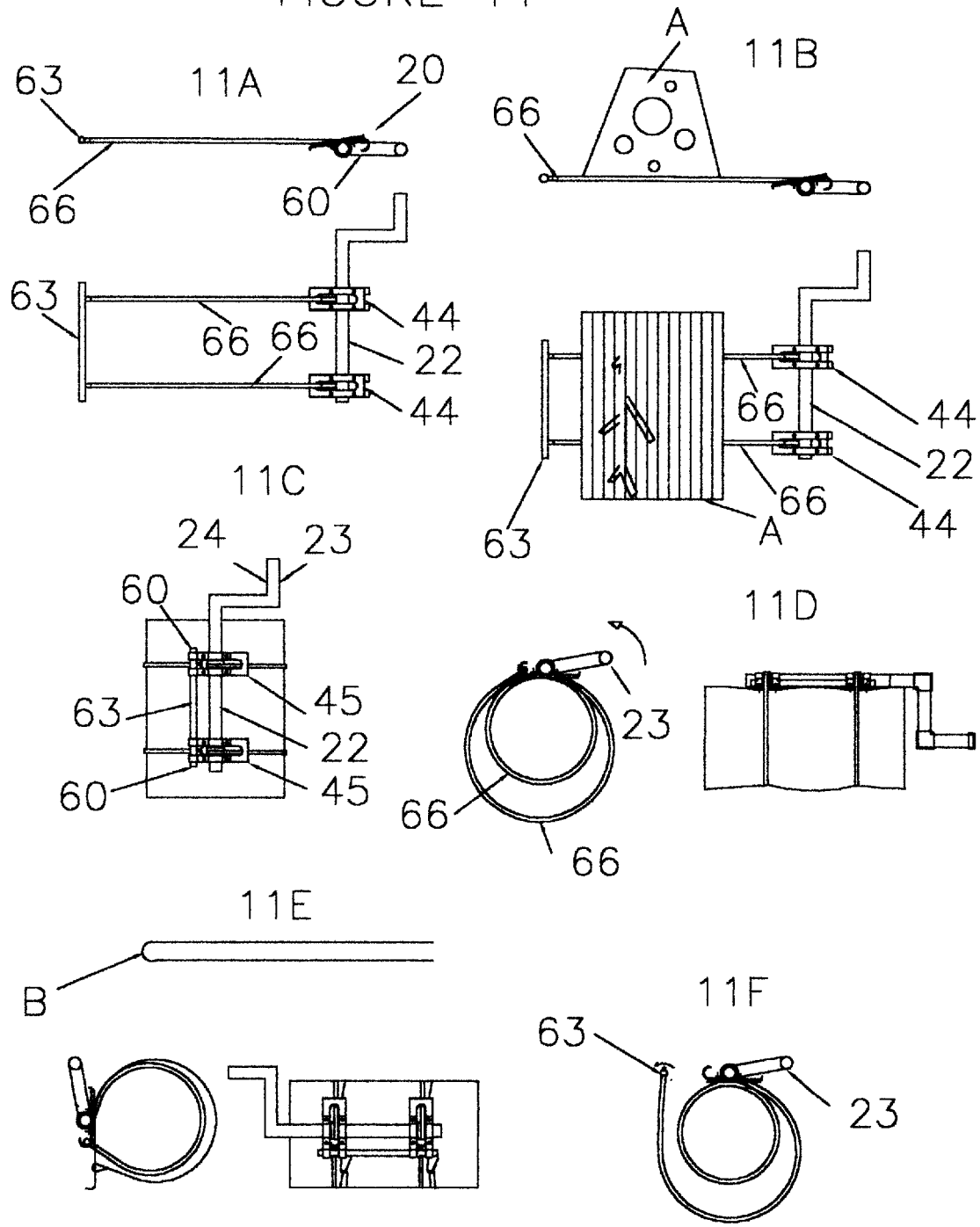

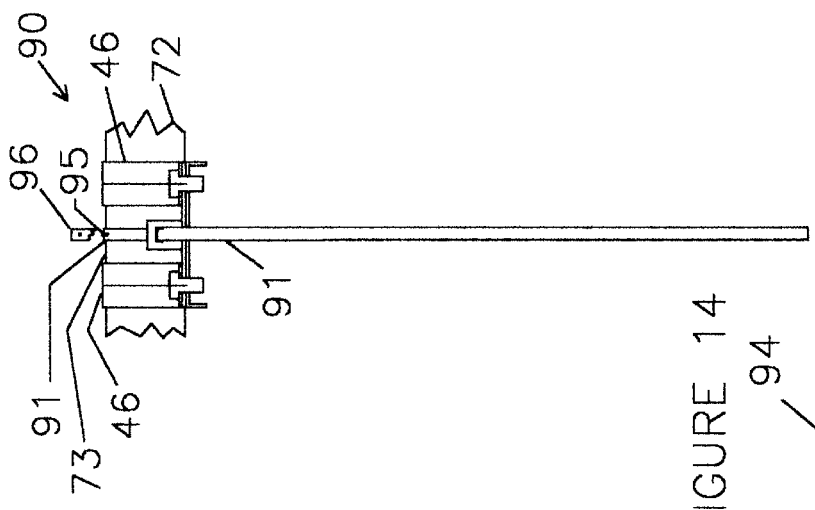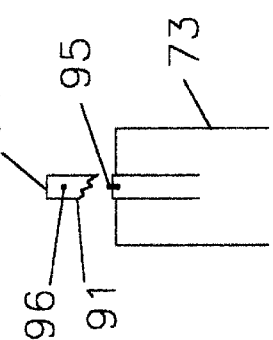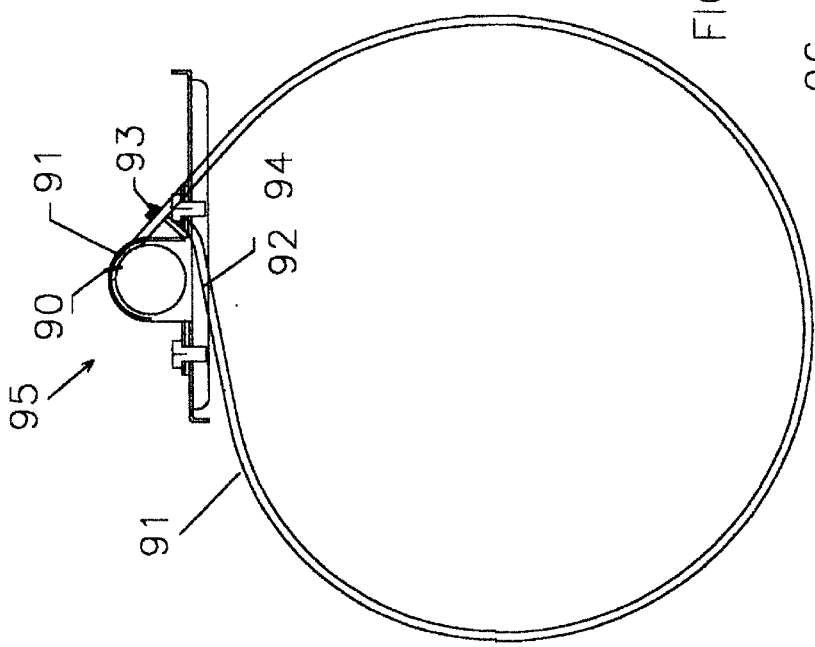

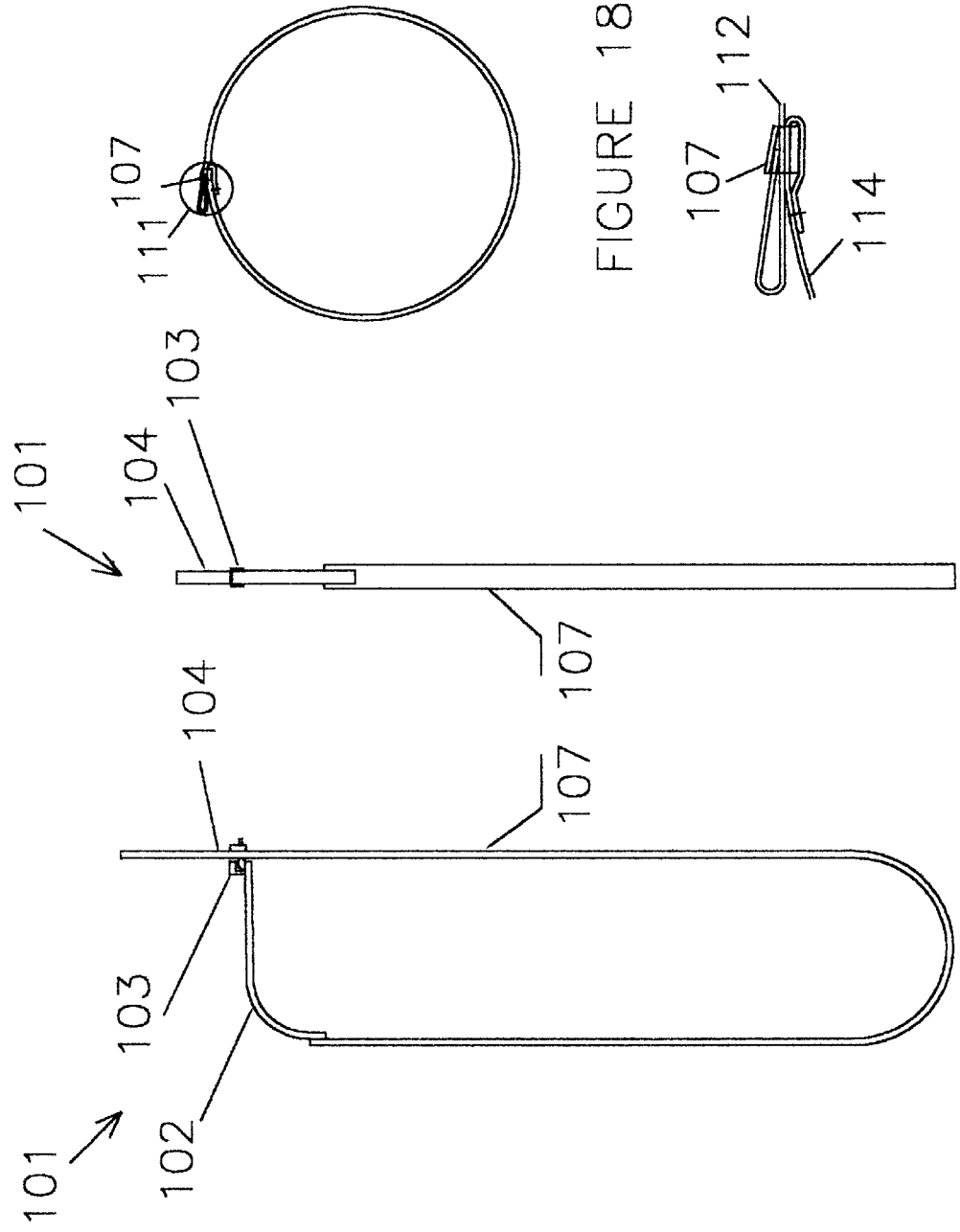

PRUNING BALER

BACKGROUND OF THE INVENTION

A. Field of the Invention

The present invention relates to articles and implements used to facilitate the handling and disposal of branches trimmed from trees or shrubs. More particularly, the invention relates to an apparatus that facilitates baling tree or shrub prunings into bundles sufficiently compact to permit an individual to conveniently transport and dispose of the prunings.

B. Description of Background Art

Branches pruned or cut from trees or shrubs can be somewhat of a nuisance to handle and dispose of. Thus, homeowners as well as professional tree trimmers and gardeners are confronted with the problem of bundling stacks of bulky, irregularly-shaped tree or shrub branches into bundles which are sufficiently compact to allow them to be picked up by hand and transported to a disposal site or truck with reasonable convenience.

One method of bundling prunings which is in common use consists simply of looping a length of twine or rope around a pile of branches, tightening the loop to compact the pile into a roughly cylindrically-shaped bundle, and tying the ends of the rope into a knot to secure the bundle. Oftentimes, especially when bundling prunings that are relatively long, two ropes or cords, one at each end of the bundle, must be used to secure the bundle in a compacted state. A disadvantage of this method of compacting bundles for prunings it that it often requires substantial tension to be exerted in the tie rope to compress the bundle to a desired size. Thus, people with limited physical strength cannot conveniently use this method to compress prunings into small bundles. Also, since the amount of tension required to compress a bundle of prunings is greater than that required to retain the bundle in a compressed state, the rope used to compact as well as secure a bundle must be substantially stronger than that required for merely securing the bundle at a desired girth.

The following two United States Patents disclose devices which may be used to compact tree trimmings.

Knutsen, U.S. Pat. No. 4,751,355, Jul. 16, 1986 discloses an apparatus for compacting a stack of tree limbs to facilitate sawing the limbs which uses a windlass having two cables.

Gray, U.S. Pat. No. 5,289,765, Mar. 1, 1994 discloses a device for applying a radial compression force on a stack of tree trimmings to compact the stack, facilitating carrying the stack or lying a rope around the stack to retain its compacted shape.

Other references know by the present inventor to relate generally to his invention include the following U.S. Patents: Richmond, U.S. Pat. No. 4,428,099, Jan. 31, 1984, Tensioning Apparatus; Backmore et al., U.S. Pat. No. 4,633, 776, Jan. 6, 1987, Branchy Compactor; Rampe et al., U.S. Pat. No. 4,827,700, May 9, 1989, Method And Apparatus For Wrapping Round Bales; Pope, U.S. Pat. No. 4,900,203, Feb. 13, 1990, Load-Tie-Down System And Winch Assembly; Shuker, U.S. Pat. No. 5,118,232, Jun. 2, 1992, Quick Tie; and Shuker, U.S. Pat. No. 5,234,298, Aug. 10, 1993, Quick Tie Load Binding System.

All of the references know by the present inventor to be related generally to the problem of compacting bundles of prunings are of rather specialized designs which limit their suitability for general purpose use by gardeners and homeowners. At best, compacting and securing piles of tree or shrub prunings into reasonably manageable bundles by prior art methods can be an annoying and time consuming task The present invention was conceived of to provide a low-cost apparatus for baling tree and shrub prunings which may be easily stored and transported and which overcomes certain limitations inherent in prior art devices while providing additional advantageous features over prior art devices.

OBJECTS OF THE INVENTION

An object of the present invention is to provide an apparatus for compressing stacks of tree or shrub trimmings into compact bundles or bales, and for securing the balls in a compacted shape to facilitate their handling and transportation.

Another object of the invention is to provide a pruning baler apparatus which may be readily used by a single individual to compact tree and shrub cutting into tight bales which may be easily handed and transported to a disposal site or pickup location for a trash hauler's subsequent removal.

Another object of the invention is to provide a pruning baler having a substantial mechanical advantage which allows an individual to exert substantially greater compressive force on a pruning bundle than could be achieved by merely tightening a rope loop around the bundle.

Another object of the invention is to provide a pruning baler which employs a winch mechanism to simultaneously tighten two tensioning ropes around longitudinally spaced-apart locations of a stack of prunings, thereby compacting and maintaining the stack in a compacted bundle while string is subsequently tied around the bundle to secure it in a compacted state.

Another object of the invention is to provide a pruning baler having all apertured shield plate through which a tensioning rope is pulled as it is wound on the shaft of a winch, the shield plate preventing pruning debris from becoming entangled with rope wound around the winch shaft.

Another object of the invention is to provide a pruning baler having a hand crank coupled to a rope tensioning windlass by means of a coaxal tubular safety clutch which limits tension in the rope to values low enough to prevent damage to the baler or injury to the user.

Another object of the invention is to provide a pruning baler having an anchor rod provided with two longitudinally spaced apart tension ropes attached at one end thereof, the other ends of the ropes being attached to a winch shaft rotatably supported in a pair of longitudinally spaced apart support structures, each provided with an upstanding hook adapted to receive the anchor bar.

Another object of the invention is to provide a pruning baler which utilizes; a pair of disposable tensioning tie wraps used both to compact and secure a pruning bundle.

Another object of the invention is to provide a pruning baler which uses a pair of disposable self-ratcheting tensioning tie wraps used both to compact and secure a pruning bundle.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as define(d by the appended claims.

SUMMARY OF THE INVENTION

Briefly stated, the present intention comprehends a device which may be used to compress and secure a stack of branches pruned from a tree or shrub into a compact bundle or bale of sufficiently small girth to facilitate convenient handling and disposal of the prunings by a single individual.

The pruning baler according to the present invention includes a winch having an elongated shaft terminated at one end by a hand crank. The winch is of novel construction, in which the shaft thereof is rotatably supported by a pair of multi-function support structures, one located near the mid point of the winch shaft, and one located near the end of the shaft opposite that of the crank. Each multi-function support structure includes a transversely elongated rectangular base plate, and a pair of longitudinally spaced apart inverted U-shaped bearing clamps that protrude upwards from the base plate and serve as rotatable supports or bearings for the winch shaft. A pair of collars of larger diameter than the bearing clamp openings are attached coaxially to the shaft on outer longitudinal sides of each bearing clamp, thereby securing each support structure in a fixed longitudinal position relative to the shaft.

The base plate of each support structure has front and rear portions which protrude radially outwards with respect to the winch shaft. A laterally elongated aperture through the thickness dimension of the base plate extends radially outwards from front and rear sides of the shaft. Each support structure has near the front end thereof a pair of longitudinally spaced apart, upwardly and rearwardly curved plate sections, located on opposite sides of the front portion of the base plate aperture. The curved plate sections function as J-hooks which protrude forward from each of the two longitudinally spaced apart winch-shaft support structures, and are adapted to removably receive and hold opposite longitudinal ends of a cylindrical anchor rod disposed radially forward of and parallel to the shaft. Thus, the J-hooks function as anchor hooks which restrain radially outward or forward movement of the anchor rod relative to the support structures. A pair of bores extend radially through the anchor rod and are longitudinally spaced apart at the same distance as the center-to-center spacing between each pair of J-hooks. Each of the anchor rod bores insertably receives a tensioning rope having a knot, ferrule or other enlargement at one end thereof to secure the tensioning rope to the anchor rod. The opposite end of each tensioning rope passes upwards through the rear portion of the aperture through each support structure base plate, and is secured to and wound around the winch shaft.

The pruning baler according to the present invention is used by releasing the anchor rod from the J-hooks, and pulling the rod and tensioning ropes attached thereto radially outwards, to unwind the tensioning ropes from the winch shaft. A stack of branches or prunings is then placed on the radially outwardly deployed pair of parallel tensioning ropes. The anchor rod and attached tensioning ropes are then looped upwards and rearwards around the stack. Next, the anchor rod is laid within the J-hooks, restraining the anchor rod against motion when the tensioning ropes are subsequently tightened around the stack. The crank arm of the winch is then turned to wind the tensioning ropes around the winch shaft and thereby increase tension in the ropes sufficiently to compress the stack of branches into a bundle of desired diameter. During this operation, the aperture through the base plate of each winch support structure provides radial clearance for tensioning rope wound around the winch shaft. Also, the rear portion of each winch support structure base plate serves as a debris shield, preventing prunings from becoming entangled with tensioning rope as it is wound around the winch shaft. While a bundle of prunings has thus been compacted by the pruning baler, a light string or rope is then looped and tied around the compacted bundle to maintain it at a desired girth.

In the preferred embodiments of pruning balers according to the present invention, the crank arm of the winch is coupled to the winch shaft by a novel slip clutch. The clutch limits the amount of torque which may be exerted on the winch shaft by the crank arm, thereby limiting forces which may be exerted by the tensioning ropes would around the winch shaft. This torque limiting action of the slip clutch prevents the operator from exerting forces on the device which are so large as to possibly damage or limit the operating life of the baler, or to cause injury to the operator.

BRIEF DESCRIPTION OF THE DRAWINGS

FIG. 3 is a fragmentary longitudinal sectional view of part of the device of FIG. 1, taken along line 3—3.

FIG. 4 is a transverse sectional view of the device of FIG. 1, taken along line 4—4.

FIG. 5 is a fragmentary end elevation view of the device of FIG. 1, showing one of the two support structures comprising parts of the device.

FIG. 6 is an upper elevation view of the structure of FIG. 5, on an enlarged scale.

FIG. 7 is a front elevation view of the structure of FIG. 5.

FIG. 8 is a transverse sectional view of the structure of FIG. 6, taken along line 8—8.

FIGS. 11A–11F are diagrammatic views of the apparatus of FIG. 1, showing steps 1–6, respectively, of a method of using the apparatus.

FIG. 12 is a fragmentary sectional end view of a first modification of the apparatus of FIG. 1.

FIG. 13 is a front elevation view of the structure of FIG. 12.

FIG. 14 is a fragmentary front elevation view of the modification of FIG. 12.

FIG. 15 is an end view of a modified cable tie used with the apparatus of FIG. 1.

FIG. 16 is a front elevation view off the cable tie of FIG. 15.

FIG. 17 is an end elevation view of a second modification of the apparatus of FIG. 1.

FIG. 18 is a fragmentary view of the structure of FIG. 17, on an enlarged scale.

DESCRIPTION OF THE PREFERRED EMBODIMENTS

FIGS. 1 through 10 illustrate a basic embodiment of a pruning baler according to the present invention, and FIG. 11 illustrates the method of using the invention. FIGS. 12–18 illustrate modifications of a pruning baler according to the present invention.

Figure 1:
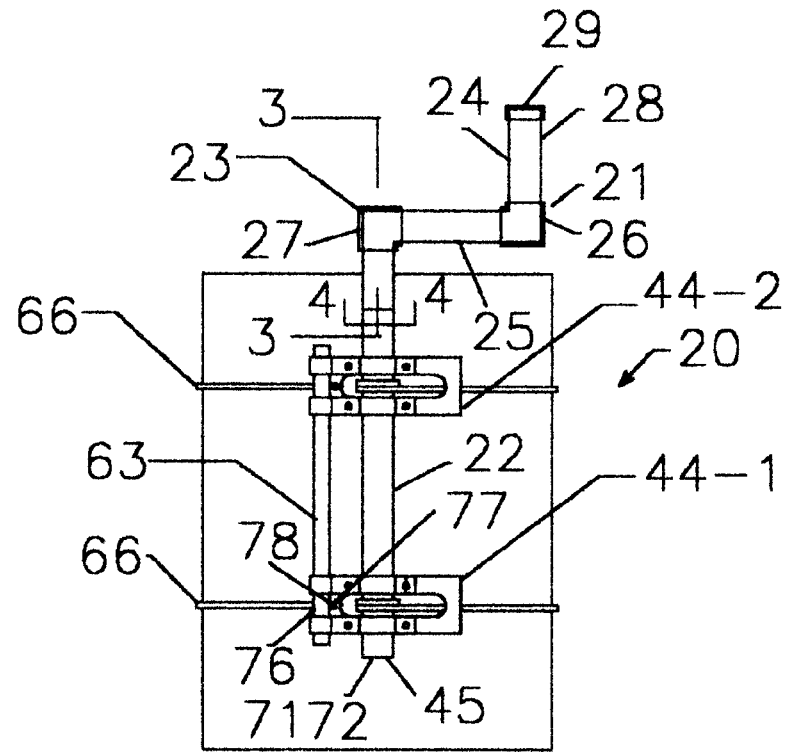
FIG. 1 is an upper plan view of a pruning baler according to the present invention.
Figure 2:
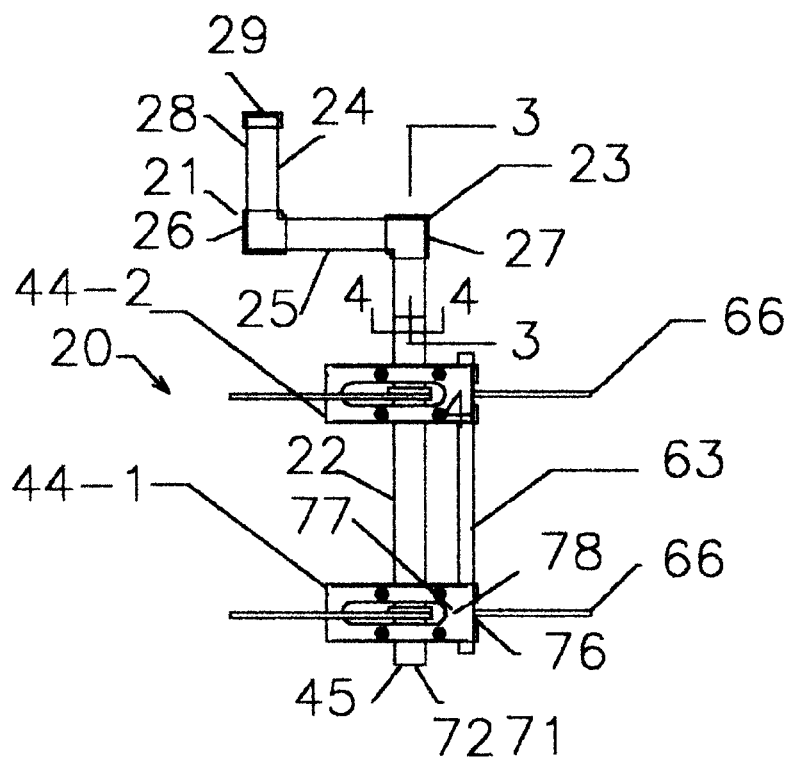
FIG. 2 is a lower plan view of the device of FIG. 1.

Referring first to FIGS. 1–10, a pruning baler 20 according to the present invention may be seen to include a winch 21 having an elongated hollow cylindrical shaft 22 terminated at a longitudinal end thereof by a hand crank 23. Hand crank 23 has a short handle section 24 disposed parallel to the axis of winch shaft 22, an arm 25 which protrudes radially outwards from one end of the winch shaft, an outer right-angle tubular elbow 26 which couples the inner end of the handle section to the outer end of the arm, and an inner right-angle tubular elbow 27 which couples the outer end of the shaft to the inner end of the arm. As shown in FIG. 1, the outer end 28 of crank handle section 24 preferably is terminated by a cup-shaped protective end cap 29 which is attached coaxially over the end of handle section.

For reasons which will be made clear in the description of the method of using baler 20 given below, winch 21 preferably employs a torque limiting slip clutch. With this construction, as shown in FIGS. 3 and 4, an outer longitudinal end portion 30 of winch shaft 22 is transversely segmented by an annular joint 31 into "input" and "output" tubular torque transmitting sections 32 and 33, respectively. As shown in FIG. 3, input tubular section 32 is rigidly joined to inner hand crank elbow 27. As is also shown in FIG. 3, output tubular section 33 is coextensive with that portion of winch shaft 22 located longitudinally inwards of annular joint 31, and is coupled to input tubular section 32 by an elongated cylindrical member such as a tubular sleeve 34, which fits coaxially within the input and output tubular torque transmitting sections, the sleeve extending longitudinally in opposite directions through joint 31 into both torque transmitting sections.

Sleeve 34 is attached rigidly to either input tubular section 32 or output tubular section 33, and fits into the other section in an interference friction fit. Thus, as shown in FIG. 3, an outer end of sleeve 34 is irrotatably fastened fixed to input tubular section 32, by a welded adhesive joint, for example. The inner end of sleeve 34 fits relatively tightly within the bore 35 of shaft 22, but is free to rotate therein upon application of sufficient relative torque between input tubular section 32 and output tubular section 33. In an example embodiment of baler 20, shaft 22 of baler 20 was made of PVC tubing having an outer diameter of 1.3 inches and an inner diameter of 0.95 inches, while sleeve 34 was made of PVC tubing and had an outer diameter of 1.05 inches, and a length of 6 inches. With that construction, torque of up to about 25 foot pounds could be transmitted from input tubular section 32 to output tubular section 33 before relative slippage occurred between input and output sections.

Constructed as described, clutch sleeve 34 cooperates with input tubular section 32 and output tubular section 33 to comprise a slip clutch 36. It should be noted that the relatively long frictional contact area between outer cylindrical wall surface 37 of sleeve 34 and inner cylindrical wall surface 38 of winch shaft 22 causes the breakaway torque between input section 32 and output section 33 to be consistently repeatable. Moreover, the exact desired value of breakaway torque may be readily adjusted by adjusting the extension length of clutch sleeve 34 within bore 35 of winch shaft 22. Thus, reducing the length of sleeve 34 from 6 inches to 3 inches would be expected to reduce the breakaway torque by about one-half, i.e., from 25 foot pounds to about 12.5 foot pounds. Similarly, increasing the length of sleeve 34 from 6 inches to 9 inches would be expected to increase the breakaway torque by about 50 percent, i.e., from 25 foot pounds to about 37.5 foot pounds.

Slip clutch 36 includes means for preventing relative longitudinal movement between input tubular section 32 and output tubular section 33 of the clutch. Thus, is shown in FIG. 3, inner transverse end wall 39 of clutch sleeve 34 is capped by a circular end plate 40. Also, inner transverse end wall 41 of input tubular end section 32 located within inner hand crank elbow 27 is capped by a circular end plate 42. An elongated straight rigid restraining bar 43 extending coaxially through clutch sleeve 34 protrudes through and is attached at opposite ends thereof to end plates 40 and 42, thereby preventing relative longitudinal movement of hand crank 23 and winch shaft 22.

Referring now to FIGS. 1 and 5–9, winch 21 of pruning baler 20 may be seen to be rotatably supported by a pair of longitudinally spaced apart support structures 44. As shown in FIG. 1, one winch shaft support structure 44-1 is located near the outer transverse wall 45 of winch shaft 22, at the longitudinal end of the shaft opposite hand crank 23. The second support structure 44-2 is located approximately mid way between outer transverse winch shaft end wall 45 and elbow 26 of hand crank 23.

Referring now primarily to FIGS. 6–9, it may be seen that each of the two winch shaft support structures 44 is constructed to perform multiple functions. Thus, as shown in FIG. 6, each support structure 44 includes a transversely elongated, generally rectangular plan-view base plate 45 which has front and rear portions 45A and 45B, respectively, that protrude radially forward and rearward approximately equal distances from winch shaft 22. A pair of upstanding, longitudinally spaced apart, inverted sem-circular-shaped flanged bearing clamps 46 are attached to the upper surface of front portion 45A of base plate 45. As shown in FIGS. 7 and 8, each bearing clamp 46 may be formed from an elongated metal strap 47 which is bent into an arch-shaped upper section 48 having a generally semi-circularly-shaped opening 49 therethrough, and front and rear radially outwardly protruding flange sections 50. Bearing clamps 46 are attached to base plate 45 of support structure 44 by any convenient means, such as by bolts 51 which pass through holes 52 provided through the thickness dimension of flanges 50, and through holes 53 provided through base plate 45. Bolts 51 are secured by nuts 54 on the underside of the base plate.

As shown in FIG. 6, base plate 45 of support structure 44 has through its thickness dimension a laterally elongated aperture 55 located between bearing clamps 46. Aperture 55 has a front portion 56 and rear portion 57 which protrude radially forwards and rearwards, respectively, between bearing clamp flanges 50. Preferably, front and rear radially outward transverse edges 58F and 58R of aperture 55 are arcuately outwardly curved, or radiused.

As may be seen best by referring to FIGS. 6 and 8, base plate 45 of each winch shaft support structure 44 has mounted on the upper surface 59 thereof a pair of J-hooks 60 formed of longitudinally spaced apart, flat metal straps curved upwardly and rearwardly into a J-shaped hook. Each J-hook 60 has a flat horizontally and rearwardly disposed leg 61 which is fastened to base plate 45. As shown in FIGS. 6–8, rear leg 61 has through its thickness dimension a mounting hole 62, and is positioned between base plate 45 and bearing clamp flange 50. With this arrangement, J-hook 60 may be secured to base plate 45 by the same bolt 51 used to secure bearing clamp 46 to the base plate. In an alternative construction, J-hook 60 could be fabricated as a continuous forward extension of front flange 50 of bearing clamp 46.

As may be seen best by referring to FIGS. 6–8, opposite longitudinal edges of base plate 45 are preferably bent downwards into flanges to form longitudinally disposed side walls 45C and 45D which depend perpendicularly downwards from the flat upper surface of the base plate. The function of these side walls is to space winch shaft 22 away from a pruning bundle on which base plate 45 is placed, thereby permitting unimpeded rotation of the winch shaft. The side walls also increase the rigidity of base plate 45. As is also shown in FIGS. 6–8, the front and rear edges of base plate 45 may be bent upwards to form transversely disposed front and rear edge walls 45E and 45F, respectively, whose function is to increase the rigidity of the base plate, and to provide a rounded surface which facilitates free passage of tensioning ropes, as will be described below.

As will be made clear in the ensuing further description of the structure and function of pruning baler 20, aperture 55 through base plate 45 allows a tensioning rope to pass through support structure 44 and be wound around that portion of the winch shaft 22 radially aligned with the aperture. As will also be described below, rear portion 45B of base plate 45 serves as a debris shield, blocking pruning debris from becoming entangled with tensioning rope wound around winch shaft 22.

As shown in FIG. 1, J-hooks 60 are used to secure an anchor rod 63, which comprises part of pruning baler 20, against forward movement relative to winch shaft 22 of the baler, as will be explained in detail below.

Figure 9:
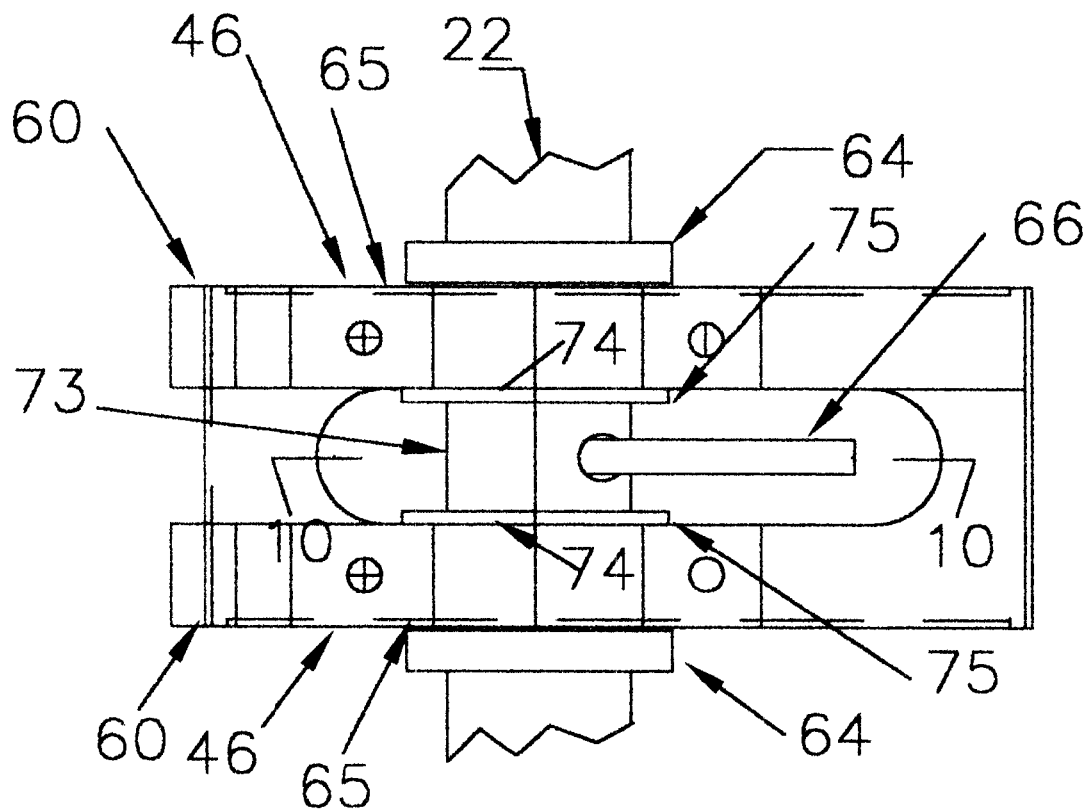
FIG. 9 is a fragmentary upper plan view of the device of FIG. 1, on a further enlarged scale.
Figure 10:
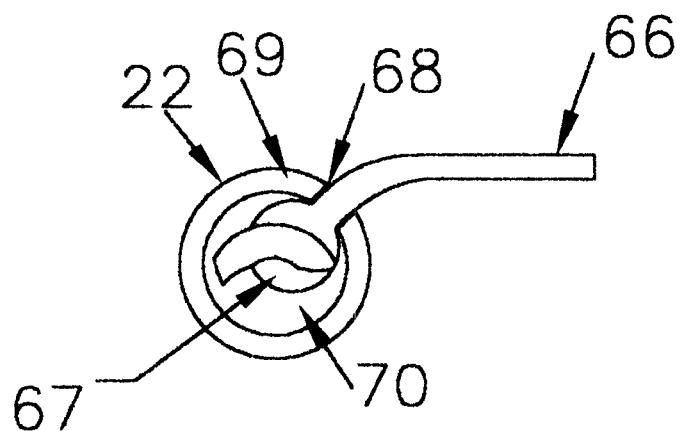
FIG. 10 is a transverse sectional view of the structure of FIG. 9, taken along line 10—10.

FIGS. 1 and 9 illustrate how winch shaft 22 of pruning baler 20 is held in a fixed longitudinal position relative to support structure 44, while permitting free rotation of the winch shaft relative to the support structure. Thus, as shown in FIGS. 1 and 9, a collar 64 is attached coaxially over winch shaft 22 adjacent the outer transverse edge walls 65 of each bearing clamp 46. Collar 64 has a larger diameter than that of opening 49 through arch 48 of bearing clamp 46, thus preventing inward longitudinal movement of winch shaft 22 relative to bearing clamp 46. As shown in FIGS. 1 and 9, a pair of collars 64 on opposite longitudinal sides of each bearing clamp 46 secures the winch shaft 22 against longitudinal movement relative to support structure 44.

As shown in FIGS. 1 and 9, pruning baler 20 includes a pair of tensioning ropes 66, each attached to winch shaft 22 between each pair of bearing clamps 46. As may be seen best by referring to FIGS. 9 and 10, a preferred method of attaching each tensioning rope 66 to winch shaft 22 consists of forming an enlargement such as a knot 67 in one end of a tensioning rope that has been threaded through a hole 68 provided through that portion of cylindrical wall 69 of the winch shaft which is located between bearing clamps 46 of support structure 44. To facilitate this attachment, a first, inner free end of tensioning rope 66 may be inserted radially inwards through hole 68, and threaded through bore 70 of winch shaft 22 until it emerges through opening 71 in outer transverse end wall 72 of the shaft. Knot 67 may then be tied at the inner end of tensioning rope 66, and the outer end of the rope pulled to withdraw the knotted end through the bore 70 of winch shaft 22.

As shown in FIG. 9, the outer cylindrical wall surface 73 of winch shaft 22 between facing inner transverse edge walls 74 of each pair of bearing clamps 46 serves as a winding surface or winch drum on which tensioning ropes 66 may be wound. Preferably, as shown in FIG. 9, a pair of annular flange plates 75 are attached coaxially over winch shaft 22 at opposite longitudinal ends of cylindrical drum sections 69 between bearing clamps 46. The function of drum flange plates is to confine longitudinally therebetween lengths of tensioning rope 66 wound thereon.

As shown in FIG. 1, anchor rod 63 of baler 20 has a generally cylindrical rod shape, and is provided with a pair of radially disposed bores 76 spaced apart at the same longitudinal distance as the center-to-center spacing between pairs of J-hooks 60. Bores 76 receive the outer ends 77 of tensioning ropes 66, which are secured to anchor rod 63 by an enlarged end such as a knot 78 formed in the outer end of the tensioning rope after it is inserted through the bore.

A preferred method of using pruning baler 20 according to the present invention may be best understood by referring to FIG. 11. Thus, as shown in FIG. 11A, anchor rod 63 of baler 20 is disengaged from anchor hooks 60, disposed parallel to winch shaft 22, and pulled forward away from the winch shaft to unwind tension ropes 66 from the, winch shaft. Baler 20 is then laid on the ground or other support surface in an inverted position, i.e., with J-hooks 60 facing down, and anchor rod 63 is laid on the ground or support surface parallel to winch shaft 22, with tension ropes 66 taut. A stack of prunings A is then placed on top of tensioning ropes 66, between anchor rod 63 and winch shaft 22, as shown in FIG. 11B. Winch shaft 22 and tension ropes 66 are then lifted upwards and forwards to position the winch shaft and tensioning ropes over stack A, with winch support structures 44 in an upright position in which base plates 45 of the support structures rest on top of the bundle, as shown in FIG. 11C. Next, as is also shown in FIG. 11C, anchor rod 63 is lifted upwards along with those lengths of tensioning ropes 66 protruding forwards from stack A. The anchor rod and tensioning rope lengths are then looped upwards and rearwards over stack A, and the anchor rod laid into the curved inner portions of J-hooks 60. With anchor rod 63 thus secured against forward motion within J-hooks 60, hand crank 23 is turned by grasping and orbitally rotating handle 24, thus winding tension ropes 66 around winch shaft 22, and thereby creating tightening the tensioning ropes around pruning stack A.

As shown in FIG. 11D, tension in tensioning ropes 66 looped around pruning stack A causes the ropes to exert a radially inwardly directed compressive force to be exerted on stack A. During this step, small twigs or other debris in the pruning stack which might become entangled with tensioning ropes 66 as they are tightened around winch shaft 22 are prevented from being drawn unto the winch shaft by rear base plate portion 45B adjacent aperture 55 through which each tensioning rope is drawn. Thus, rear portion 45B of each base plate 44 functions as a debris shield, preventing pruning debris from becoming entangled with lengths of tensioning rope 66 being wound around winch shaft 22. As tensioning ropes 66 are tightened around pruning stack A, support structure base plates 45 of baler 20 rest on the stack, and serve as an anchor plate or fulcrum on which the compression forces exerted on the stack may be exerted while the winch remains in a fixed position relative to the bundle. When pruning stack A has thus been compressed into a bundle of a desired girth, a string loop B is looped around the bundle and tied, as shown in FIG. 11E. This operation may be performed by the same individual who operated hand crank 23. This is made possible by the fact that once pruning bundle A has been compressed, it will not elastically expand upon removal of hand crank torque, because compacted pruning bundles tend to be inelastic.

With a pruning bundle A secured in a compact bundle by a string B, hand crank 23 of pruning baler 20 may be turned in the appropriate direction to unwind tensioning ropes 66 from winch shaft 22, allowing anchor rod 63 to be lifted upward and rearward to disengage the anchor rod 63 from J-hooks 60, as shown in FIG. 11F. Bundle A may then be lifted away from pruning baler 20, and suitably disposed of.

FIGS. 12–14 illustrate a first modification of a pruning baler according to the present invention. The modified pruning baler 90 shown in FIGS. 12–14 substitutes one-time use cable ties for both tensioning ropes 66 and the tie-string B. Thus, as shown in FIGS. 12–14, modified pruning baler 90 includes a pair of elongated flat nylon cable ties 91, each of which is provided at a first end 92 thereof with a ratcheting buckle 93. The opposite end 94 of each cable tie 91 is inserted through its ratcheting buckle 93 and attached to each of the two winch drum sections 73 of winch shaft 22 located between pairs of bearing clamps 46 of each of the two support structures 44. Thus, as shown in FIG. 14, each drum section 73 of winch shaft 22 is provided with a radially outwardly protruding anchor pin 95 which is insertably received through an aperture 96 in end 94 of cable tie 91.

To use modified baler 20, a pair of longitudinally spaced apart cable ties 91 are looped around a pruning stack A, inserted through ratcheting buckle 93, and hooked onto anchor pins 95 on winch shaft 22. Hand crank 23 of pruning baler 90 is then turned to tension cable tie 91 around a pruning stack A, until the bundle has been compressed to desired girth. Finally, that portion of cable tie 91 between ratcheting buckle 93 and anchor pin 95 is cut off and discarded.

FIGS. 15 and 6 illustrate a modification of the cable tie 91 shown in FIGS. 12–14. In modified cable tie 101 shown in FIGS. 15 and 16, a length of inexpensive binding strap 107 made of nylon or other flexible material is spliced between first and second ends 102 and 104 of a nylon cable tie including a ratcheting buckle 103. A hole 106 is provided through end 104 of cable tie 101, for receiving anchor pin 96 of winch shaft 22. Since the nylon cable tie material used to engage buckle 103 tends to be relatively expensive, using a shorter length of nylon cable tie material spliced to a length of a less expensive binding strap material results in a cable tie suitable for use with baler 20 which may be of reduced cost.

FIGS. 17 and 18 illustrate a second modification of a cable tie useable with baler 20. As shown in FIGS. 17 and 18, second modified cable tie 111 utilizes a wedge friction brake 107 to secure first and second ends 112 and 114 of the cable tie together after the cable tie has been tightened by baler 20 around a pruning bundle.

End portion 112 of cable tie 111 is provided with a hole 116 located a shot distance inwards of the outer end of end portion 112, for receipt of winch shaft anchor pin 96. When attached to anchor pin 96, a short length of winch cable tie 111 extends beyond anchor pin 96. After winch action is complete and the bale is compressed, the tension band's free end, i.e., the end beyond the shaft attachment point, is looped back to the wedge friction clamp and fed into the clamp, as shown in FIG. 18.

The free end fed to wedge against the tension band creates a friction brake that maintains the band's tension on the bale after the crank is relaxed. After securing the tension band in the wedge friction brake, the tension band loop is cut between the wedge brake and the shaft to allow removal of the bale from the baler.

Other modifications to the novel pruning baler according to the present invention are possible, such as the incorporation of ratcheting mechanisms to permit rotation of the winch shaft only in a desired direction.

What is claimed is:

1. A device for compressing a stack of prunings from trees or shrubs into a generally cylindrically-shaped bundle suitable for transporting and disposal comprising;
   a. a winch shaft,
   b. at least a first support means including a base plate having bearing means for rotatably supporting said winch shaft, said base plate having through its thickness dimension an aperture disposed radially rearwards from said winch shaft for receiving therethrough a tensioning cable,
   c. means for rotating said winch shaft,
   d. at least a first elongated flexible tensioning cable adapted for attachment at a first end thereof to said winch shaft, and for being wound around said shaft when said shaft is rotated,
   e. anchor means at a second end of said tensioning cable, and
   f. hook means fixed to said support means for releasably engaging and restraining said anchor means against motion in response to tension exerted by said tensioning cable upon rotation of said winch shaft, whereby said support means may be placed in contact with a stack of prunings, said tensioning cable looped around said stack, said anchor means engaged by said hook means, and said winch shaft rotated by said rotating means to thereby increase tension in said tensioning cable and thereby radially compress said stack.

2. The device of claim 1 wherein said hook means is further defined as being attached to said base plate at a front portion thereof.

3. The device of claim 2 wherein said hook means is further defined as having an upwardly oriented opening.

4. The device of claim 3 wherein said anchor means at said second end of said cable is further defined as comprising a cylindrical member adapted to be inserted into said opening of said hook.

5. The device of claim 1 further including means for restraining said winch shaft against longitudinal motion relative to support means.

6. The device of claim 5 further including a second one of said support means spaced longitudinally apart from said first support means.

7. The device of claim 1 wherein said means for rotating said winch shaft is further defined as comprising a hand crank coupled by coupling means to a longitudinal end of said winch shaft.

8. The device of claim 7 wherein said coupling means is further defined is incorporating torque-limiting means.

9. The device of claim 8 wherein said torque limiting means is further defined as being a slip clutch.

10. The device of claim 9 wherein said slip clutch is further defined as comprising in combination a first, input tubular member, a second longitudinally adjacent, coaxial output tubular member, and a cylindrical coupling member rigidly fastened to one of said input and output members, and, frictionally rotatable within the bore of the opposite of said input and output tubular members.

11. A device for baling stacks of branches pruned from trees and shrubs into compact bundles suitable for transportation and disposal comprising;

a. a winch including an elongated winch shaft and a hand crank at a first longitudinal end of said shaft, b. at least one multi-function support structure for abutting a stack of prunings and rotatably supporting said winch shaft radially spaced apart from said pruning stack, said support structure including a base plate adapted to abut a stack of prunings, a bearing structure protruding upwards from said base plate for rotatably supporting said winch shaft, and means for limiting relative longitudinal motion between said support structure and said winch shaft, c. at least a first elongated flexible tensioning cable windably attached at a first end thereof to said winch shaft in longitudinal alignment with said support structure, d. anchor means fastened to a second end of said tensioning cable, and e. hook means attached to said support structure for releasably engaging and restraining said anchor means against radial motion relative to said winch shaft in response to tension exerted by said tensioning cable upon said tensioning cable being wound around said winch shaft.

12. The device of claim 11 further including a second one of said support structure longitudinally spaced apart from said first support structure.

13. The device of claim 12 wherein said base plate of said support structure is further defined as having front and rear portions which protrude radially forward and rearward, respectively, of said winch shaft.

14. The device of claim 13 wherein said hook means is further defined as comprising at least one arcuately upwardly and rearwardly curving J-hook having an opening which faces radially rearwards towards said winch shaft.

15. The device of claim 14 wherein said anchor means fastened to said second end of said tensioning cable is further defined as being an elongated rod member adapted to fit with said opening of said J-hook.

16. The device of claim 15 wherein at least said rear portion of said base plate is further defined as having through its thickness dimension an aperture disposed radially rearwards from said winch shaft, said aperture being adapted to receive said first end portion of said tensioning cable and allowing said tensioning cable to be wound around said winch shaft, while a portion of said base plate adjacent said aperture blocks passage of pruning debris.

17. The device of claim 16 wherein said aperture through said base plate is further defined as protruding radially forward from said winch shaft, thereby providing forward radial clearance for tensioning cable wound on said winch shaft.

18. The device of claim 11 wherein said hand crank is coupled to said winch shaft by a torque limiting slip clutch.

19. The device of claim 18 wherein said winch shaft is further defined as being of hollow tubular construction.

20. The device of claim 19 wherein said torque limiting slip clutch is further defined as comprising in combination an elongated cylindrical member which fits within the bores of said hand crank and said winch shaft, said cylindrical member fitting with a frictional fit within at least one of said bores.

* * * * *